United States Patent
Weisenstein et al.

(10) Patent No.: US 10,511,059 B1
(45) Date of Patent: Dec. 17, 2019

(54) ALKALINE POUCH CELL WITH COATED TERMINALS

(71) Applicant: ZAF ENERGY SYSTEMS, INCORPORATED, Bozeman, MT (US)

(72) Inventors: Adam Weisenstein, Bozeman, MT (US); Allen Charkey, Winter Haven, FL (US); Melissa D. McIntyre, Butte, MT (US); Blaine D. Latimer, Bozeman, MT (US); Benjamin J. Washburn, Bozeman, MT (US)

(73) Assignee: ZAF Energy Systems, Incorporated, Bozeman, MT (US)

( * ) Notice: Subject to any disclaimer, the term of this patent is extended or adjusted under 35 U.S.C. 154(b) by 0 days.

(21) Appl. No.: 16/192,512

(22) Filed: Nov. 15, 2018

(51) Int. Cl.
| | |
|---|---|
| *H01M 10/28* | (2006.01) |
| *H01M 2/08* | (2006.01) |
| *H01M 2/30* | (2006.01) |
| *H01M 4/24* | (2006.01) |
| *H01M 2/02* | (2006.01) |

(52) U.S. Cl.
CPC ............ *H01M 10/28* (2013.01); *H01M 2/02* (2013.01); *H01M 2/08* (2013.01); *H01M 2/30* (2013.01); *H01M 4/244* (2013.01)

(58) Field of Classification Search
CPC ........ H01M 10/28; H01M 10/26; H01M 2/02; H01M 2/08; H01M 2/30; H01M 4/244
USPC .......................................................... 429/174
See application file for complete search history.

(56) References Cited

U.S. PATENT DOCUMENTS

| | | | |
|---|---|---|---|
| 2003/0148173 A1* | 8/2003 | Gu ........ | H01M 2/0212 429/62 |
| 2014/0255778 A1* | 9/2014 | Huh ........ | H01M 2/26 429/211 |
| 2016/0028051 A1* | 1/2016 | Yoon ........ | H01M 2/0212 429/185 |
| 2016/0028110 A1* | 1/2016 | Yu ........ | H01M 10/052 429/303 |
| 2016/0260953 A1* | 9/2016 | Lim ........ | H01M 2/26 |
| 2016/0322638 A1* | 11/2016 | Erickson ...... | H01M 4/0471 |
| 2016/0329547 A1* | 11/2016 | Jin .......... | H01M 2/26 |
| 2017/0040580 A1* | 2/2017 | Andry ...... | H01M 2/08 |
| 2017/0040584 A1* | 2/2017 | Kurakane .... | H01M 2/1653 |
| 2018/0175345 A1* | 6/2018 | Schmid-Schoenbein ... H01M 2/08 |

* cited by examiner

*Primary Examiner* — Amanda C. Walke
(74) *Attorney, Agent, or Firm* — Brooks Kushman P.C.

(57) ABSTRACT

A battery cell includes an electrode assembly having a negative electrode, positive electrode, and separator bathed in an alkaline electrolyte, a pouch encapsulating the electrode assembly, and first and second tabs respectively extending from the positive and negative electrodes through the pouch. The first tab has thereon a coating including acrylic paint and the second tab has thereon a coating including lacquer to discourage creepage of the alkaline electrolyte along the first and second tabs and out of the pouch.

9 Claims, 2 Drawing Sheets

ALKALINE POUCH CELL WITH COATED TERMINALS

TECHNICAL FIELD

This disclosure relates to alkaline pouch cells.

BACKGROUND

Alkaline batteries provide a viable and safe alternative to lithium-ion and lead-acid counterparts. Improved safety is one of the most significant advantages of alkaline batteries, which makes this technology an ideal candidate for a variety of applications. The alkaline electrolyte is a nonflammable aqueous alkaline solution and does not exhibit thermal runaway, which unlike lithium-ion batteries have repeatedly experienced such issues resulting in battery recalls. Consequently, the thermal management systems, which are required with lithium-ion systems, may be less complicated or eliminated with alkaline batteries.

SUMMARY

A battery cell includes an electrode assembly having a negative electrode, positive electrode, and separator bathed in an alkaline electrolyte, a pouch encapsulating the electrode assembly, and first and second tabs respectively extending from the positive and negative electrodes through the pouch. The first tab has thereon a coating including acrylic paint and the second tab has thereon a coating including lacquer to discourage creepage of the alkaline electrolyte along the first and second tabs and out of the pouch.

DETAILED DESCRIPTION

Figure 1:
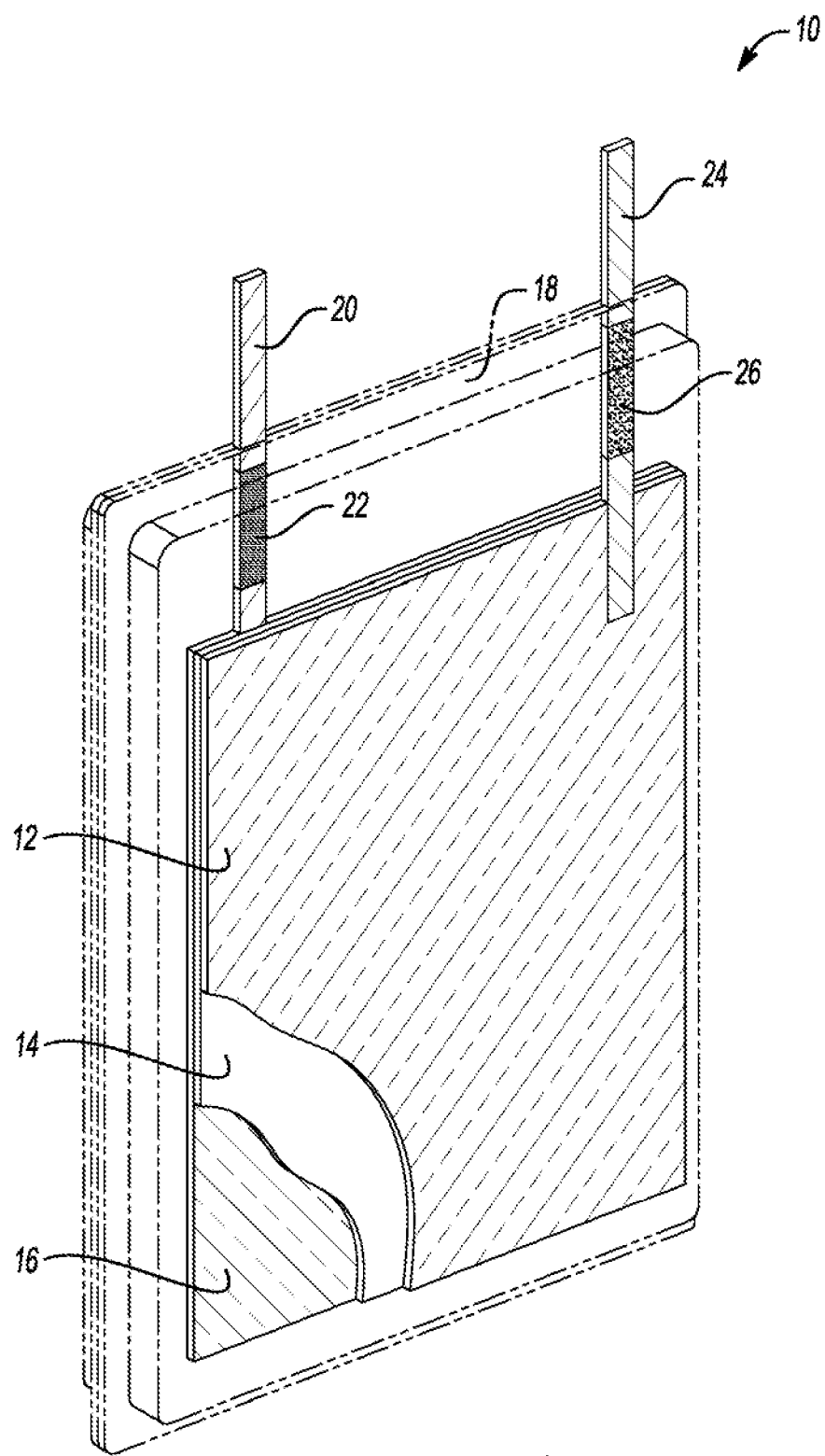
FIG. 1 is a front view of an alkaline pouch cell containing a positive electrode, separator/electrolyte reservoir, negative electrode, pouch materials, negative tab coated with lacquer, and a positive tab coated with acrylic paint.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Alkaline batteries are typically confined to a rigid and heavy outer case confining the electrode stack and electrolyte, which limits the possible applications for the alkaline chemistries. Elimination of the outer cell case creates new possibilities for applications of alkaline batteries as well as greatly increases the specific energy and energy density of the cells. This approach requires a thin, lightweight, and flexible pouch design; however, alkaline pouch cells tend to leak due to electrolyte creepage. By using coatings including lacquer on the negative tab and coatings including acrylic paint on the positive tab, electrolyte creep is virtually eliminated, and a hermetic-like seal around the tabs can be achieved, therefore enabling long life and leak free pouch cell construction.

An alkaline secondary battery electrode stack, in one example, includes a separator assembly disposed between a positive electrode and negative electrode in contact with an alkaline electrolyte. The positive electrode can be composed of manganese dioxide, nickel oxyhydroxide, or silver oxide, and the negative electrode can be composed of zinc or zinc oxide. The electrolyte can contain potassium hydroxide, sodium hydroxide, lithium hydroxide, indium hydroxide, cesium hydroxide, rubidium hydroxide, or other additives combined with water.

Typically, the electrode stack is confined by a heavy rigid case made of thermopliastics. The rigid thermoplastic case provides a seal between the atmosphere and the cell stack, which eliminates any problems with electrolyte leakage and loss of life due to electrolyte degradation. However, these thick thermoplastics limit the flexibility and decrease the specific energy of the alkaline batteries; thereby, eliminating the alkaline chemistry from many applications.

To overcome the drawbacks of the rigid thermoplastic cases, a simple pouch design can be engineered for alkaline chemistries which eliminates alkali surface creep that causes loss of electrolyte and decreases cell life. The pouch can be constructed using combinations of polyethylene, aluminum foil, aluminum metallized polyester, polyester, polyamide, and polypropylene. The failure point in most pouch cell designs occurs around the sealing of the electrode tabs due to surface creep of alkali carbonates. This failure point can be eliminated using lacquer-based coatings on the negative tab and acrylic paint on the positive tab. The tabs are then sealed to the pouch material by using combinations of synthetic rubber (e.g. butyl synthetic rubber), ionomer resins, thermoplastic adhesives, epoxies, or other adhesives that do not degrade when exposed to the alkaline electrolyte. Therefore, a seal around the tabs and pouch material can be achieved, enabling long life and leak free pouch cell construction.

A leak free alkaline pouch cell was developed to provide an enclosure capable of achieving high specific energy and energy density, while providing the flexibility to be utilized in many applications that were previously not considered due to the historically utilized rigid cell case. FIG. 1 is a front view, of an alkaline pouch cell 10 containing a positive electrode 12, separator/electrolyte reservoir 14, negative electrode 16, pouch 18, negative tab 20 coated with lacquer 22, and a positive tab 24 coated with acrylic paint 26. In this example, the separator/electrolyte reservoir 14 is between the positive and negative electrodes 12, 16. And, the pouch 18 surrounds and encapsulates the separator/electrolyte reservoir 14 and positive and negative electrodes 12, 16. The negative and positive tabs 20, 24 extend respectively from the negative and positive electrodes 16, 12 and through the pouch 18. Alkaline electrolyte fills the pouch 18 bathing the components therein.

The positive electrode 12 may include manganese dioxide, nickel oxyhydroxide, or silver oxide. The negative electrode 16 may include zinc. The positive tab 24 may include nickel. The negative tab 20 may include combinations of copper, silver, tin, or silver-plated copper. A material of the pouch 18 may include polyamide, polyester, polyethene, or polypropylene coated aluminum. Other suitable materials may also be used.

Figure 2:
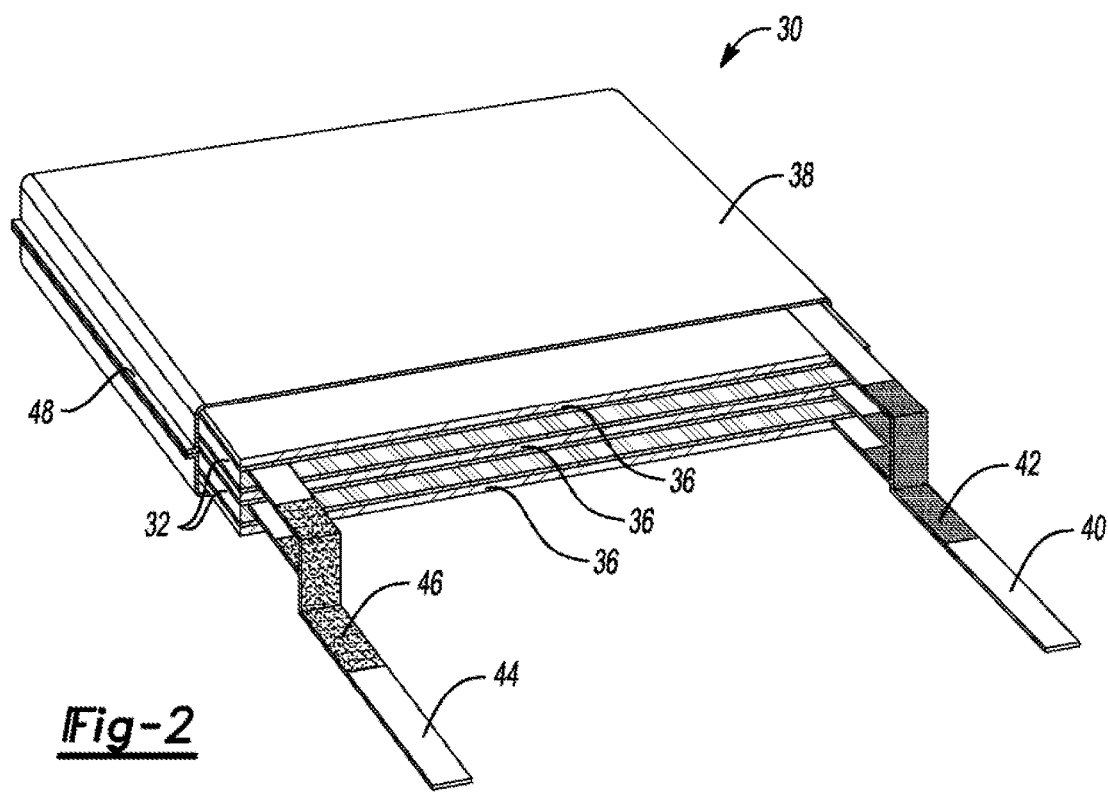
FIG. 2 is a perspective view, partially sectioned, of an alkaline pouch cell containing and electrode stack made up of positive electrodes, separators/electrolyte reservoirs, negative electrodes, pouch materials, negative tabs coated with lacquer, and positive tabs coated with acrylic paints.
Figure 3:
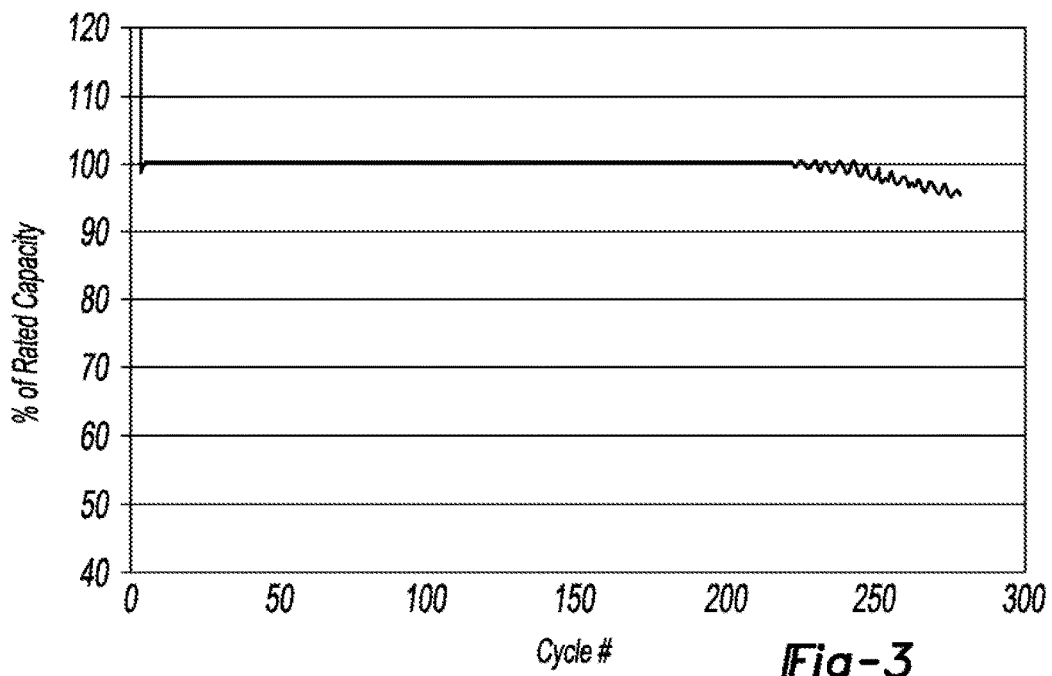
FIG. 3 is a graph of a nickel-zinc alkaline pouch cell cycled at a C/3 rate and 80% depth of discharge.

FIG. 2 is a perspective of an alkaline pouch cell 30 containing an electrode stack made up of positive electrodes 32, separators/electrolyte reservoirs (obscured), negative electrodes 36, pouch 38, negative tabs 40 coated with lacquer 42, and positive tabs 44 coated with acrylic paints 46. The pouch 38 includes a perimeter seal 48. That is, the pouch 38 includes front and rear panels joined at the perimeter seal 48. The perimeter seal 48 may be accomplished via combinations of heat seals, adhesives, epoxies, ionomer resins, or synthetic rubbers. Other materials may also be used.

A nickel-zinc alkaline chemistry life cycle test was performed with a three-electrode system in a pouch cell. The pouch contained an electrode stack made up of one nickel electrode, separators/electrolyte reservoirs, two zinc electrodes, pouch materials, negative tabs coated with lacquer, and positive tabs coated with acrylic paints. The cycles consisted of 80% depth of discharge cycles at C/3 rates for charge and discharge. Initial tests showed a capacity retention of greater than 95% at 275 complete cycles, indicating minimal degradation of the capacity of the pouch cell while eliminating electrolyte leakage.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to appearance, cost, durability, ease of assembly, life cycle cost, manufacturability, marketability, packaging, serviceability, size, strength, weight, etc. As such, embodiments described as less desirable than other embodiments or prior art implementations with respect to one or more characteristics are not outside the scope of the disclosure and may be desirable for particular applications.

What is claimed is:

1. A battery cell comprising:
   an electrode assembly including a negative electrode, positive electrode, and separator bathed in an alkaline electrolyte;
   a pouch encapsulating the electrode assembly; and
   first and second tabs respectively extending from the positive and negative electrodes through the pouch, the first tab having thereon a coating including acrylic paint and the second tab having thereon a coating including lacquer.

2. The battery cell of claim 1, wherein materials of the first and second tabs are different.

3. The battery cell of claim 1, wherein the first tab includes nickel.

4. The battery cell of claim 1, wherein the second tab includes copper, silver, tin or silver-plated copper.

5. The battery cell of claim 1, wherein the pouch includes a perimeter seal of adhesive, epoxy, ionomer resin, synthetic rubber, or heat seal.

6. The battery cell of claim 1, wherein the negative electrode includes zinc or zinc oxide.

7. The battery cell of claim 1, wherein the positive electrode includes manganese dioxide, nickel oxyhydroxide, or silver oxide.

8. The battery cell of claim 1, wherein the alkaline electrolyte contains potassium hydroxide, sodium hydroxide, lithium hydroxide, indium hydroxide, cesium hydroxide, or rubidium hydroxide.

9. The battery cell of claim 1, wherein a material of the pouch includes polyamide, polyester, polyethene, aluminum metallized polyester, or polypropylene coated aluminum.

* * * * *